United States Patent
Brown

(10) Patent No.: US 10,023,208 B2
(45) Date of Patent: Jul. 17, 2018

(54) ZIPWIRE TROLLEY BRAKING

(71) Applicant: International Safety Components Ltd, Bangor, Gwynedd (GB)

(72) Inventor: Kevin Brown, Bangor Gwynedd (GB)

(73) Assignee: International Safety Components Ltd., Bangor (GB)

( * ) Notice: Subject to any disclaimer, the term of this patent is extended or adjusted under 35 U.S.C. 154(b) by 296 days.

(21) Appl. No.: 15/067,742

(22) Filed: Mar. 11, 2016

(65) Prior Publication Data

US 2016/0355197 A1     Dec. 8, 2016

Related U.S. Application Data

(60) Provisional application No. 62/301,168, filed on Feb. 29, 2016.

(30) Foreign Application Priority Data

Jan. 23, 2015   (GB) .................................... 1501129.9

(51) Int. Cl.
| | | |
|---|---|---|
| B61H 9/04 | (2006.01) | |
| B61H 9/02 | (2006.01) | |
| F16D 63/00 | (2006.01) | |
| A63G 21/22 | (2006.01) | |
| F16D 59/00 | (2006.01) | |

(52) U.S. Cl.
CPC .............. *B61H 9/04* (2013.01); *A63G 21/22* (2013.01); *B61H 9/02* (2013.01); *F16D 59/00* (2013.01); *F16D 63/008* (2013.01)

(58) Field of Classification Search
CPC . B61H 9/02; B61H 9/04; A63G 21/20; A63G 21/22; F16D 63/008; A62B 1/14; B61B 7/00
See application file for complete search history.

(56) References Cited

U.S. PATENT DOCUMENTS

| | | | | |
|---|---|---|---|---|
| 5,156,240 | A | * 10/1992 | Ostrobrod | A62B 1/14 |
| | | | | 182/193 |
| 5,323,873 | A | * 6/1994 | Pelofi | A62B 35/04 |
| | | | | 182/192 |

(Continued)

FOREIGN PATENT DOCUMENTS

| | | |
|---|---|---|
| DE | 1073393 B | 1/1960 |
| EP | 0803268 A1 | 10/1997 |

(Continued)

OTHER PUBLICATIONS

Search Report GB1501129.9 dated Feb. 11, 2015.

*Primary Examiner* — Zachary L Kuhfuss
(74) *Attorney, Agent, or Firm* — King & Schickli, PLLC

(57) ABSTRACT

A zipwire trolley having a plurality of zipwire engaging rollers, a swivelable brake block assembly adjacent to one of the rollers, the brake block having a zipwire-engaging cam by which the roller can be at least partially lifted off the zipwire when the trolley is moving in a rearward direction, the cam having a pair of tapered sidewalls tending to pinch respectively opposite sides of the upper part of the zipwire as the brake block progressively rotates when the trolley is moving in a rearward direction, thereby preventing or inhibiting further rearward movement of the trolley.

10 Claims, 10 Drawing Sheets

(56) References Cited

U.S. PATENT DOCUMENTS

| | | | | |
|---|---|---|---|---|
| 5,638,919 A | * | 6/1997 | Pejout | A62B 1/14 |
| | | | | 182/192 |
| 6,019,195 A | * | 2/2000 | Pelofi | A62B 1/14 |
| | | | | 182/192 |
| 8,234,980 B2 | * | 8/2012 | Boren | B61H 9/02 |
| | | | | 104/112 |
| 9,004,235 B2 | * | 4/2015 | Headings | F16D 63/008 |
| | | | | 104/113 |
| 9,021,962 B2 | * | 5/2015 | Hackett | F16D 63/008 |
| | | | | 104/113 |
| 9,573,605 B2 | * | 2/2017 | Steele | A63G 21/22 |
| 2006/0288901 A1 | * | 12/2006 | Cylvick | A63G 21/22 |
| | | | | 104/112 |
| 2011/0239898 A1 | * | 10/2011 | Brown | A63G 21/20 |
| | | | | 105/150 |
| 2013/0220743 A1 | | 8/2013 | Headings | |
| 2013/0333586 A1 | * | 12/2013 | Cylvick | A63G 21/22 |
| | | | | 104/113 |
| 2014/0196990 A1 | * | 7/2014 | Steele | A63G 21/22 |
| | | | | 188/65.2 |
| 2014/0311376 A1 | | 10/2014 | Brannan | |

FOREIGN PATENT DOCUMENTS

| | | |
|---|---|---|
| GB | 2513337 A | 10/2014 |
| GB | 2518573 B | 10/2015 |
| WO | 2010110821 A1 | 9/2010 |

\* cited by examiner

ZIPWIRE TROLLEY BRAKING

This invention relates to zipwire trolleys typically, but not exclusively, as used in adventure parks by people engaged in extreme sports.

BACKGROUND OF THE INVENTION

As is well known, zipwire trolleys are used to transport people along a cable (or zipwire) fixed at one, higher, end to a suitable anchor point and fixed at another, lower, end to another anchor point which usually includes some kind of buffer arrangement, such as a shock absorber or grab rope, for slowing down the trolley at the end of the descent, which descent may at times reach speeds in excess of 150 Km/h. In order to lessen the speed of the trolley before it reaches the buffer point the zipwire is not stretched perfectly taught but is instead provided with a dip in the middle section such that as the trolley passes the lowermost point of the cable it then has to rise in order to reach the buffer point and, in so doing, slows down to a manageable level as it reaches it. However, for a variety of reasons, including the size and weight of the user of the trolley and prevailing weather conditions, it is possible that the trolley does not reach the buffer point, in which case it rolls back to the middle lowermost point of the zipwire, thereby requiring the user of the trolley to be rescued. This is both alarming and potentially hazardous for the user of the trolley, and also prevents other potential users of the zipwire from using it until the rescue has been completed, perhaps 30 minutes later.

The present invention is derived from the realisation that there is a need for a simple brake mechanism that prevents or inhibits the aforesaid problem without considerably increasing the cost or complexity of the trolley.

SUMMARY OF THE INVENTION

According to a first aspect of the invention there is provided a zipwire trolley having a plurality of zipwire engaging rollers, a swivelable brake block adjacent to one of the rollers, the brake block having a zipwire-engaging cam by which the roller can be at least partially lifted off the zipwire when the trolley is moving in a rearward direction, the cam having a pair of tapered sidewalls tending to pinch respectively opposite sides of the upper part of the zipwire as the brake block progressively rotates when the trolley is moving in a rearward direction, thereby preventing or inhibiting further rearward movement of the trolley.

With this arrangement the brake block is only activated when the trolley begins to reverse and, in doing so, the weight component normally supported by the roller is instead transferred directly to the brake block, with the roller itself being effectively disengaged from the zipwire, in which position the zipwire trolley can be more easily retrieved because of the likelihood of it coming to a stop near to the buffer point rather than at a position midway between both anchor points after it has rolled back to the lowermost point of the zipwire.

According to a second embodiment of the invention there is provided a swivellable zipwire trolley brake block assembly having a cam with tapered sidewalls tending to pinch respectively opposite sides of the upper part of the zipwire as the brake block progressively rotates when the trolley is moving in a rearward direction, thereby preventing or inhibiting further rearward movement of the trolley.

In these embodiments of the invention the sidewalls are tapered towards the cam surface such that they act as braking surfaces tending to "pinch" respectively opposite sides of the upper part of the zipwire as the cam surface progressively rotates the brake block. This is a particularly useful feature where the zipwire is made from a substantially non-compressable material such as steel where the use of a cam surface only for braking may not otherwise be as effective due to the cam surface simply sliding over the top of the zipwire.

In accordance with a third embodiment of the invention the brake block of the first and second embodiments is adjustable as to width, such as by being split in a plane coincident with the major axis of the zipwire when the brake block is mounted thereon, such that the brake block can be used on zipwires of varying diameter and/or can be adjusted to compensate for wear of either the brake block and/or the zipwire, such adjustment being afforded by threaded fasteners such as bolts or in any other suitable manner, such as by counter-rotating cam surfaces by which the effective width of the brake block can be adjusted.

In a fourth embodiment of the invention the brake block is co-operable with a swivelable lever arm by which upon anti-clockwise rotation the brake block mechanism is disengaged thereby allowing the zipwire trolley to be moved along the zipwire in a rearward direction relative to its normal forward direction. Alternatively, clockwise movement of the lever arm may also disengage the brake block by causing it to swivel away from the zipwire. In either occurrence it will be understood that a zipwire trolley to which such a lever arm mechanism is fitted can be easily retrieved if it has travelled past the buffer arrangement by e.g. the lever arm hitting a grab rope, thereby causing anti-clockwise rotation of the lever arm, or by the lever arm missing the grab rope but tilting forwards and rotating in a clockwise manner due to the deceleration encountered as the zipwire trolley passes through the buffer arrangement.

BRIEF DESCRIPTION OF THE DRAWINGS

The invention will now be described, by way of example only, with reference to the accompanying drawings in which.

DETAILED DESCRIPTION OF THE DRAWINGS

Figure 5:
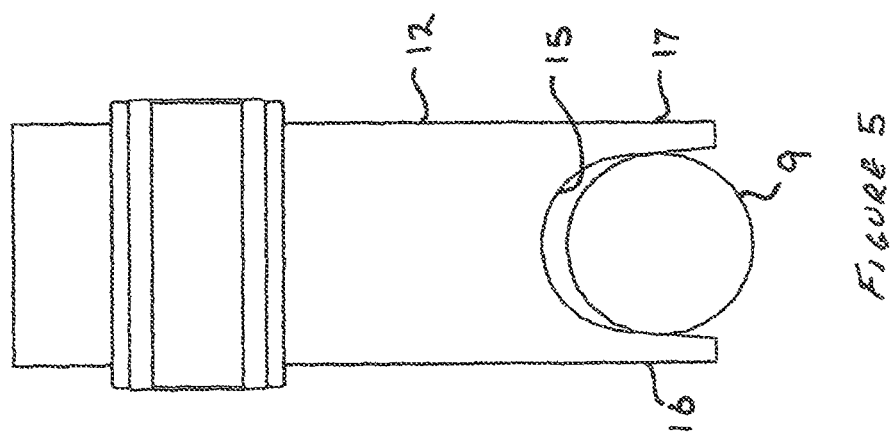
FIG. 5 is a partial end view of the brake mechanism resting on a zipwire.

Referring firstly to the embodiment of the invention shown with reference to FIGS. 1 to 5, a zipwire trolley shown generally at 1 includes a pair of generally flat side plates 2, 3, between which are secured a pair of axles 4, 5 which also serve, along with spacer pin 6 to maintain the side plates 2, 3, in parallel relationship. Rotatably mounted on the axles 4, 5, are respective zipwire flanged rollers 7, 8, shaped to engage the zipwire 9 as shown in FIG. 5. At the lower end of each side plate 2, 3 are a pair of eyes 10, 11 for receiving therethrough part of a karabiner (not shown) for supporting the weight of a user of the trolley 1. In accordance with a first embodiment of the invention the trolley 1 is provided at its trailing end, relative to the direction of travel shown arrowed, with a brake block 12 mounted for swivelling movement about a threaded bolt 13 secured between the side plates 2, 3. A spring loaded brake block de-activation pin 14 extends from the body of the brake block 12 by which swivelling movement of the brake block 12 is selectively limited to the extent shown in FIG. 4, although further swivelling movement of the brake block 12 is possible if the pin 14 is depressed by an amount sufficient to clear the side plate 3.

The trailing end of the brake block 12 is provided with an arcuate generally inverted "U"-shaped cam 15 having sidewalls 16, 17 which taper gently inwards as shown more clearly with reference to FIG. 5, where the brake block 12 and attendant sidewalls 16, 17 are shown mounted on the zipwire 9.

Figure 2:
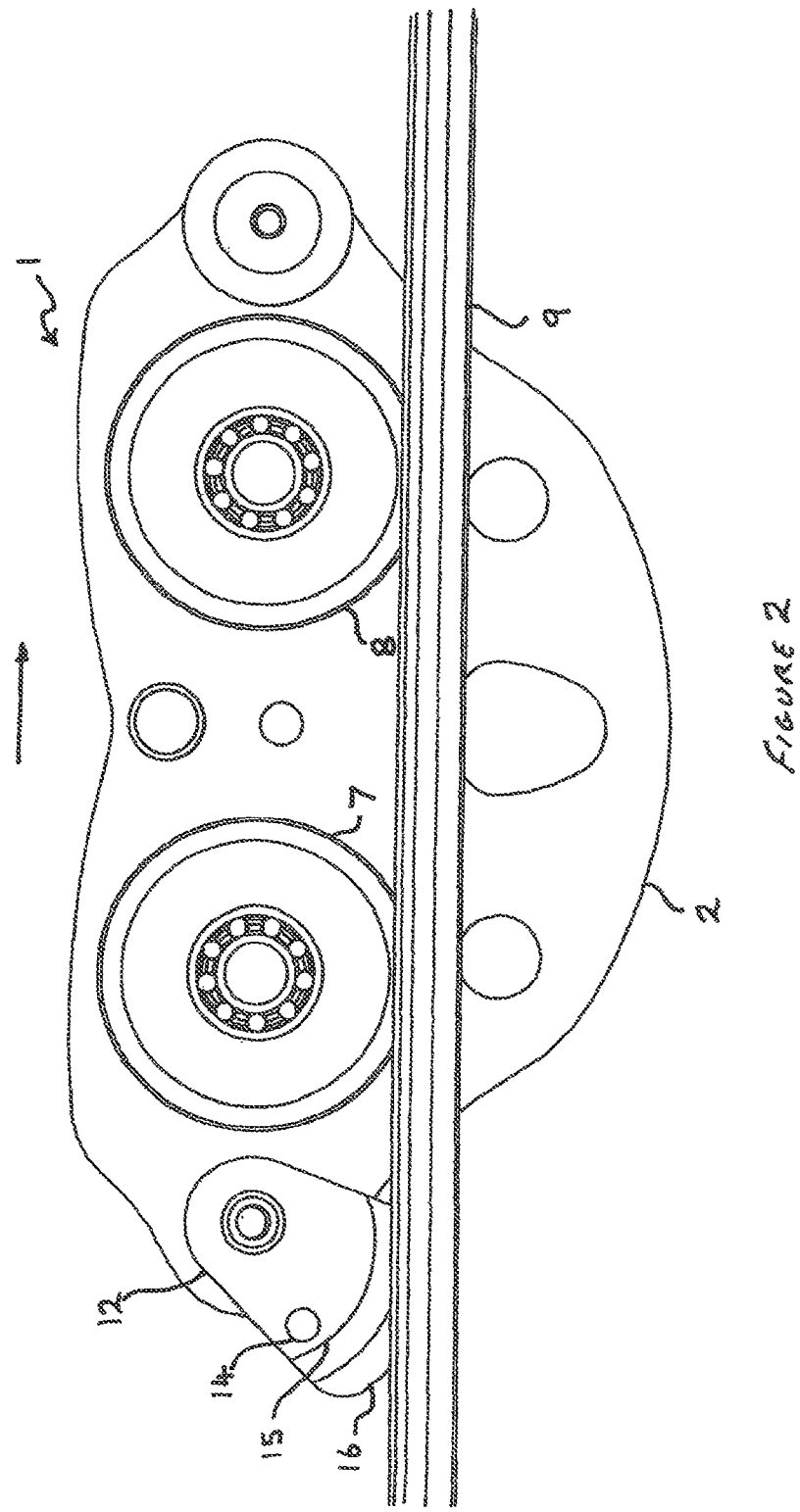
FIG. 2 is an exposed side view of the zipwire trolley of FIG. 1, travelling in a forward direction.
Figure 3:
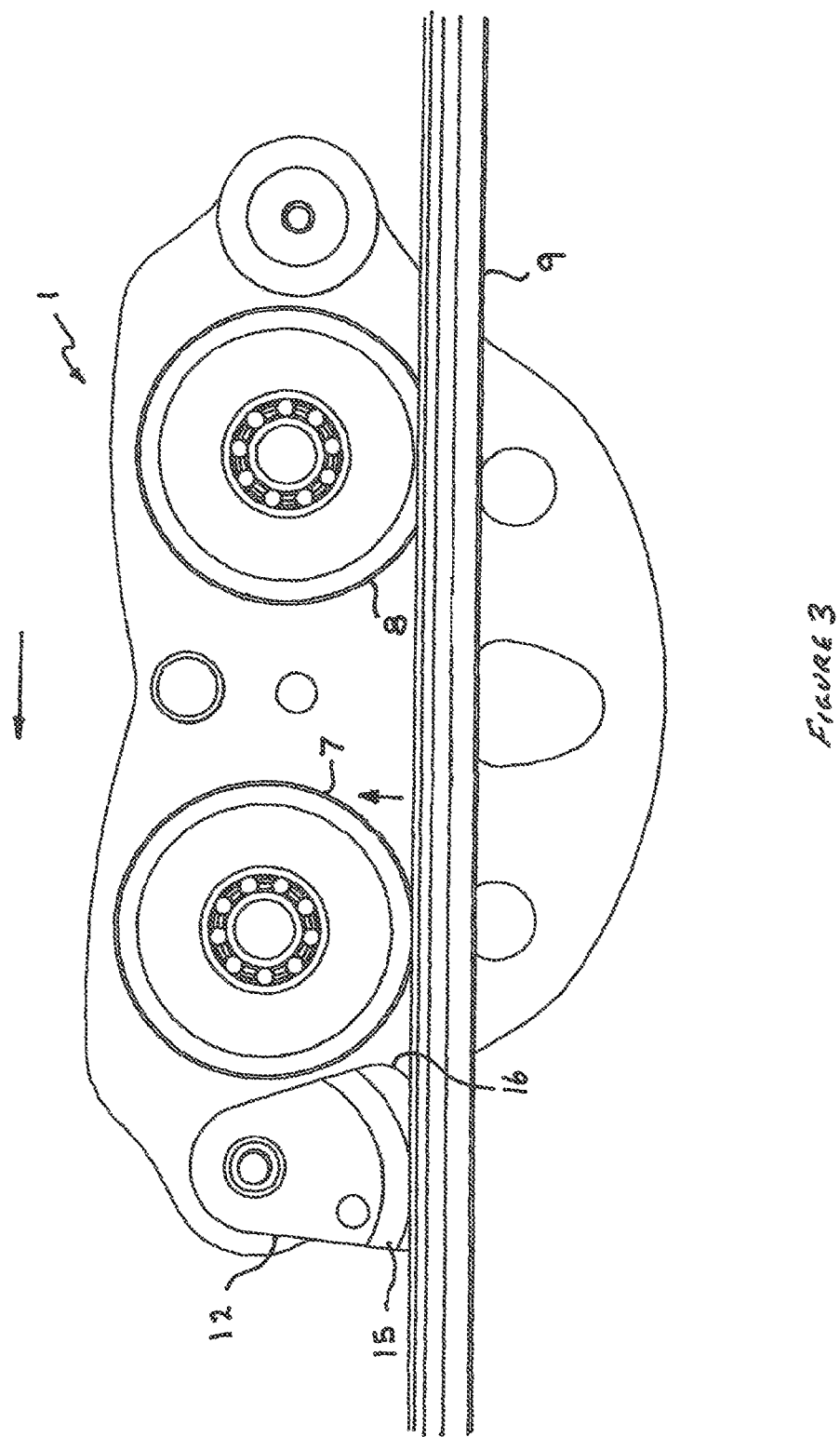
FIG. 3 is an exposed side view of the zipwire trolley of FIG. 1 travelling in a reverse direction.
Figure 4:
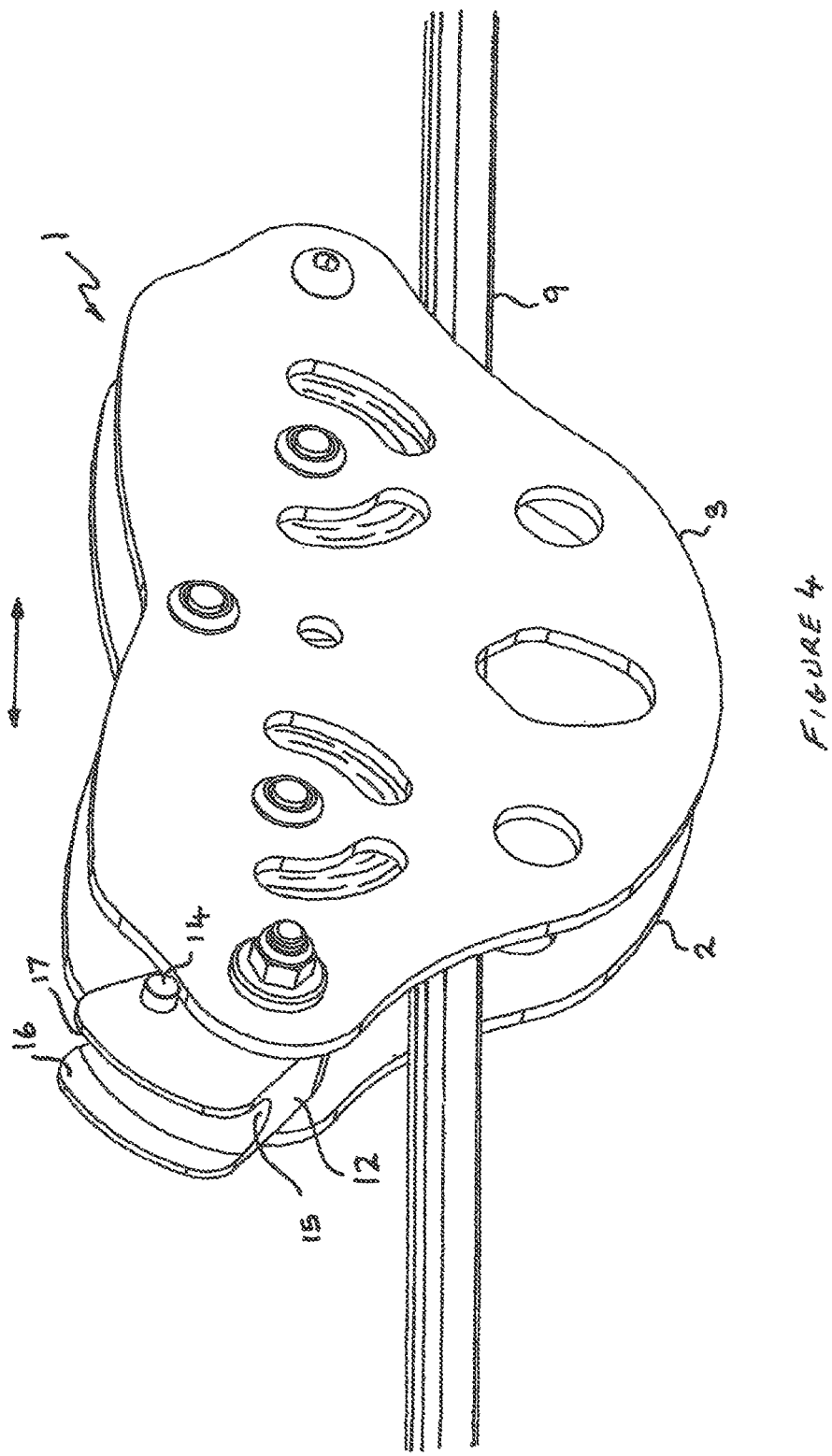
FIG. 4 is a perspective view of the zipwire trolley of FIG. 1 with the brake mechanism shown disengaged.

FIG. 2 shows an exposed view of the trolley 1 with the sidewall 3 and also the sidewall 17 removed so that only half of the brake block 12 is shown for clarity. In the condition shown the rollers 7, 8 both rest on the zipwire 9 and the brake block 12 trails behind the roller 7 when the trolley 1 is moving forward in the direction arrowed. The brake block 12 therefore has no appreciable braking effect on the trolley 1 but in the event of the direction of travel reversing as shown in FIG. 3 the cam 15 moves to the position shown in which the flanged wheel 7 becomes disengaged from the zipwire 9 with the tensile load on the wheel 7 being transferred instead to the cam 15 of the brake block 12. In addition, because of the inwardly tapered sidewalls 16, 17 the load originally carried by the flanged wheel 7 is used to increase the grip on the zipwire 9, therefore arresting any rearward movement promptly and efficiently.

Figure 6:
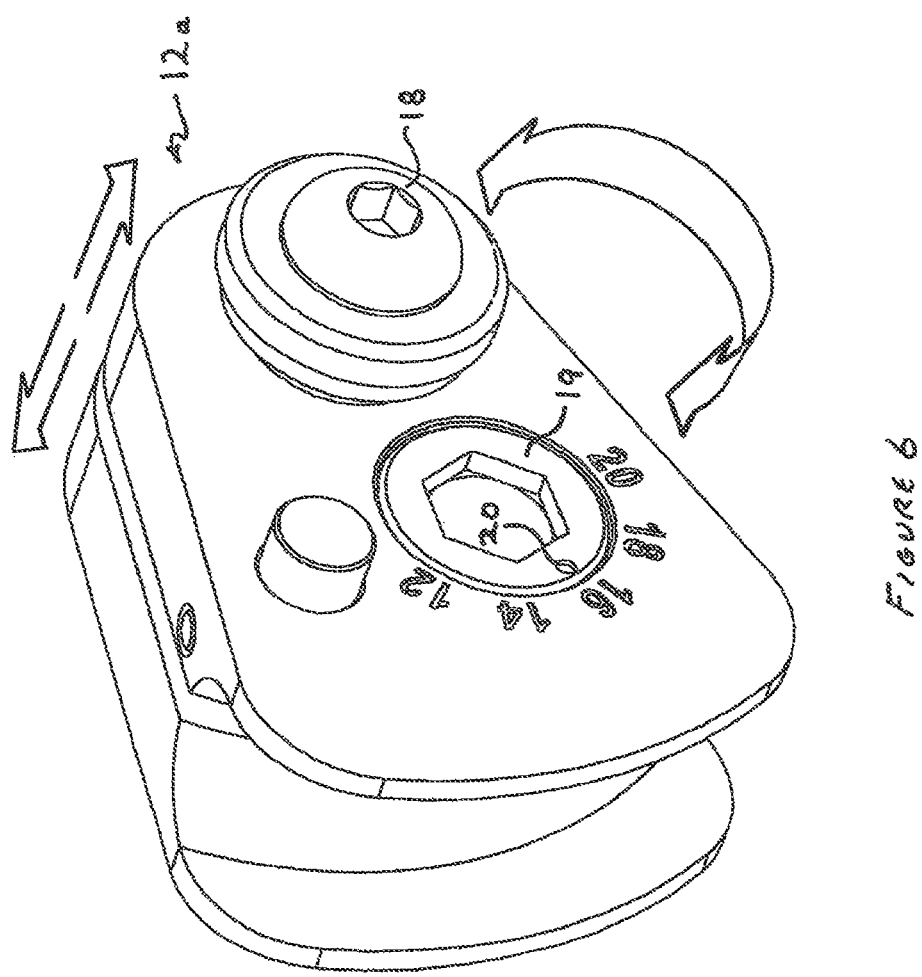
FIG. 6 is a perspective view of an adjustable alternative brake block for use with different diameters of zipwire.

As will be apparent from the brake block embodiment shown with reference to FIG. 5 it can only be used on a zipwire 9 of a particular diameter and in accordance with a second embodiment of the invention shown in FIG. 6 the brake block 12a is adjustable as to width by being split in half, each half being adjustably connected by a pair of threaded bolts 18, 19, the latter also including a width indicator 20 such that upon rotation by a user of the device the amount of adjustment being made can be easily seen. The adjustability of the brake block 12a therefore provides for a zipwire trolley to which it is mounted to be used with varying diameters of zipwire.

Figure 7:
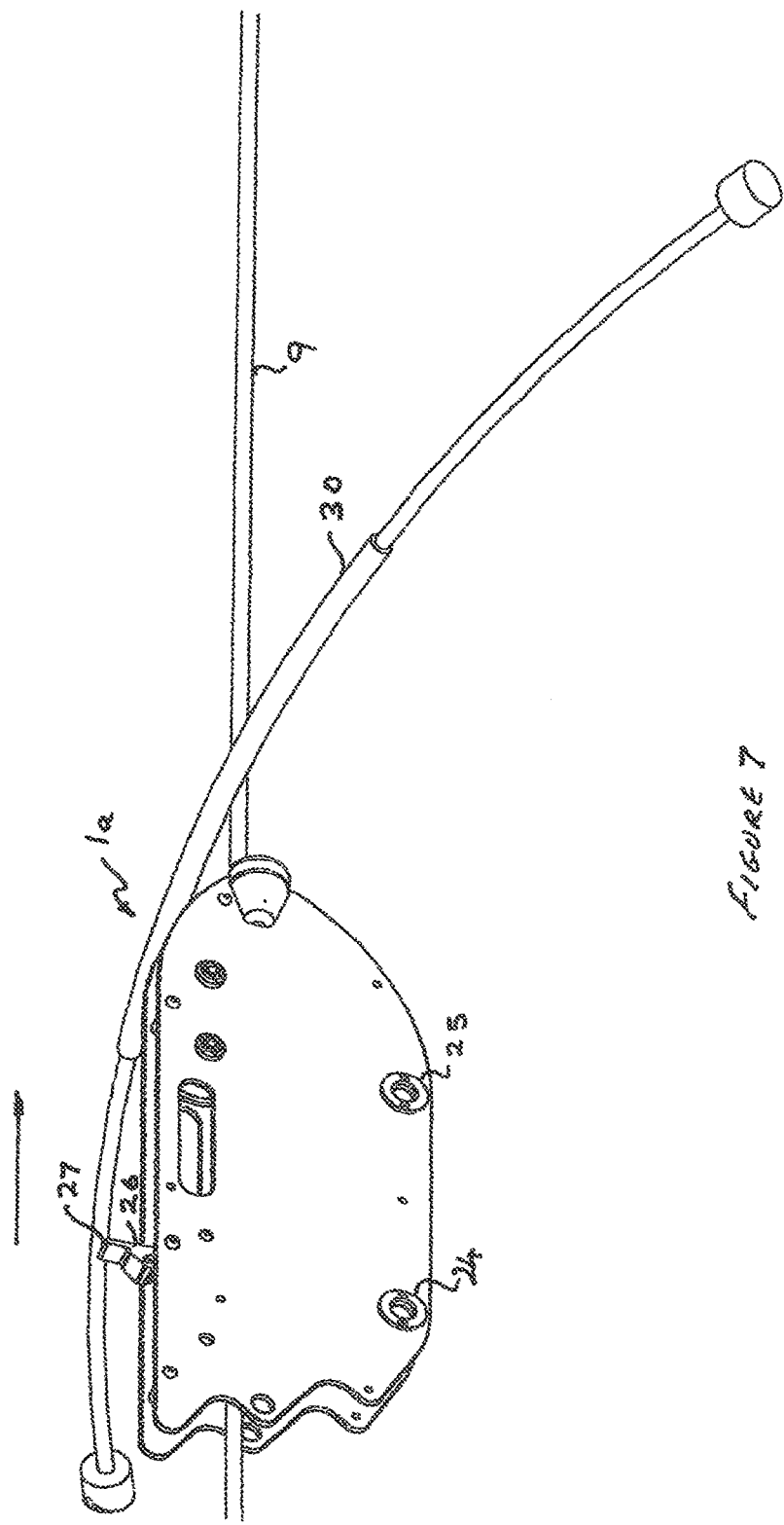
FIG. 7 shows another alternative embodiment of the invention in which the zipwire trolley is approaching a buffer arrangement in the form of a rope grab.
Figure 8:
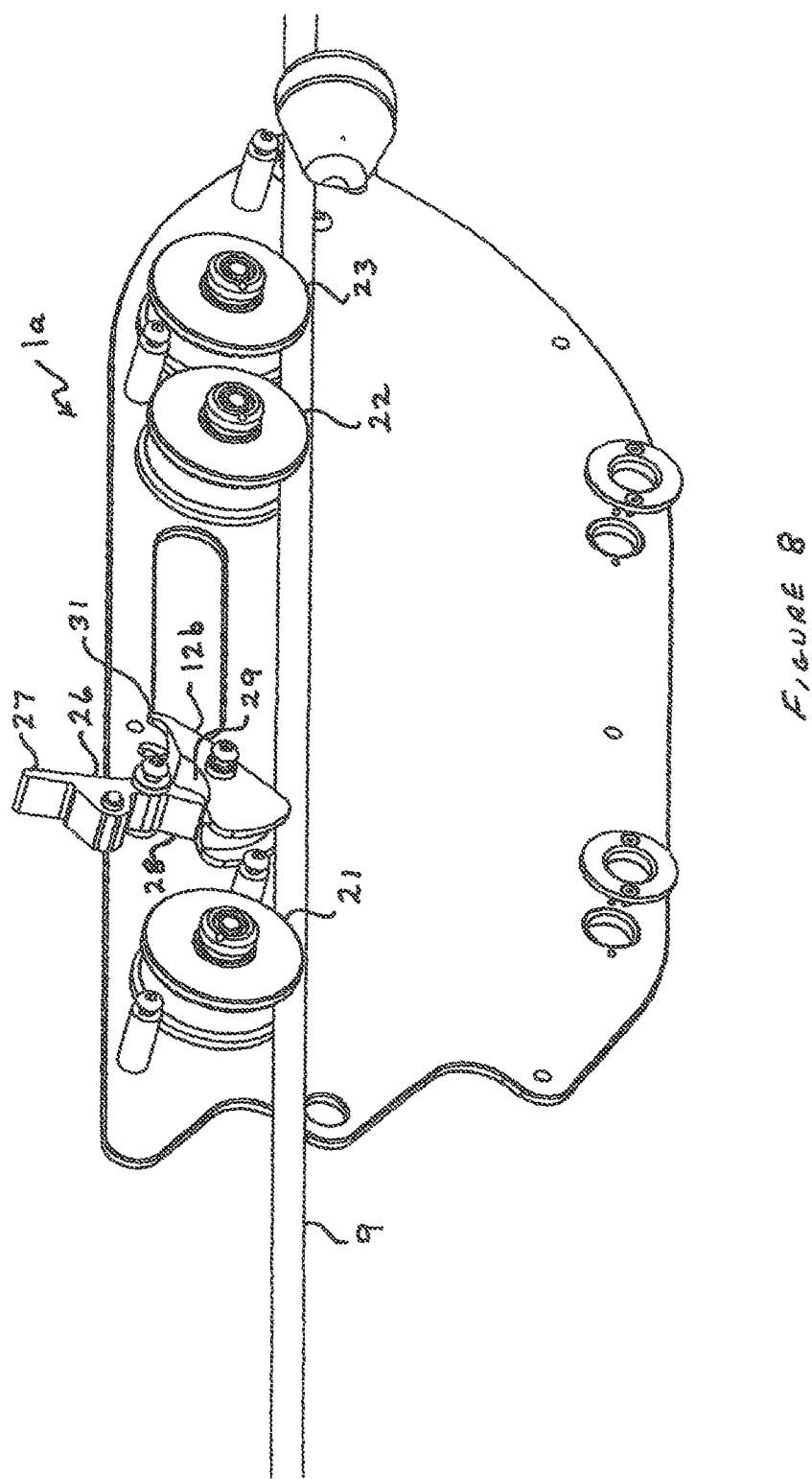
FIG. 8 is an exposed view of the zipwire trolley arrangement of FIG. 7.
Figure 9:
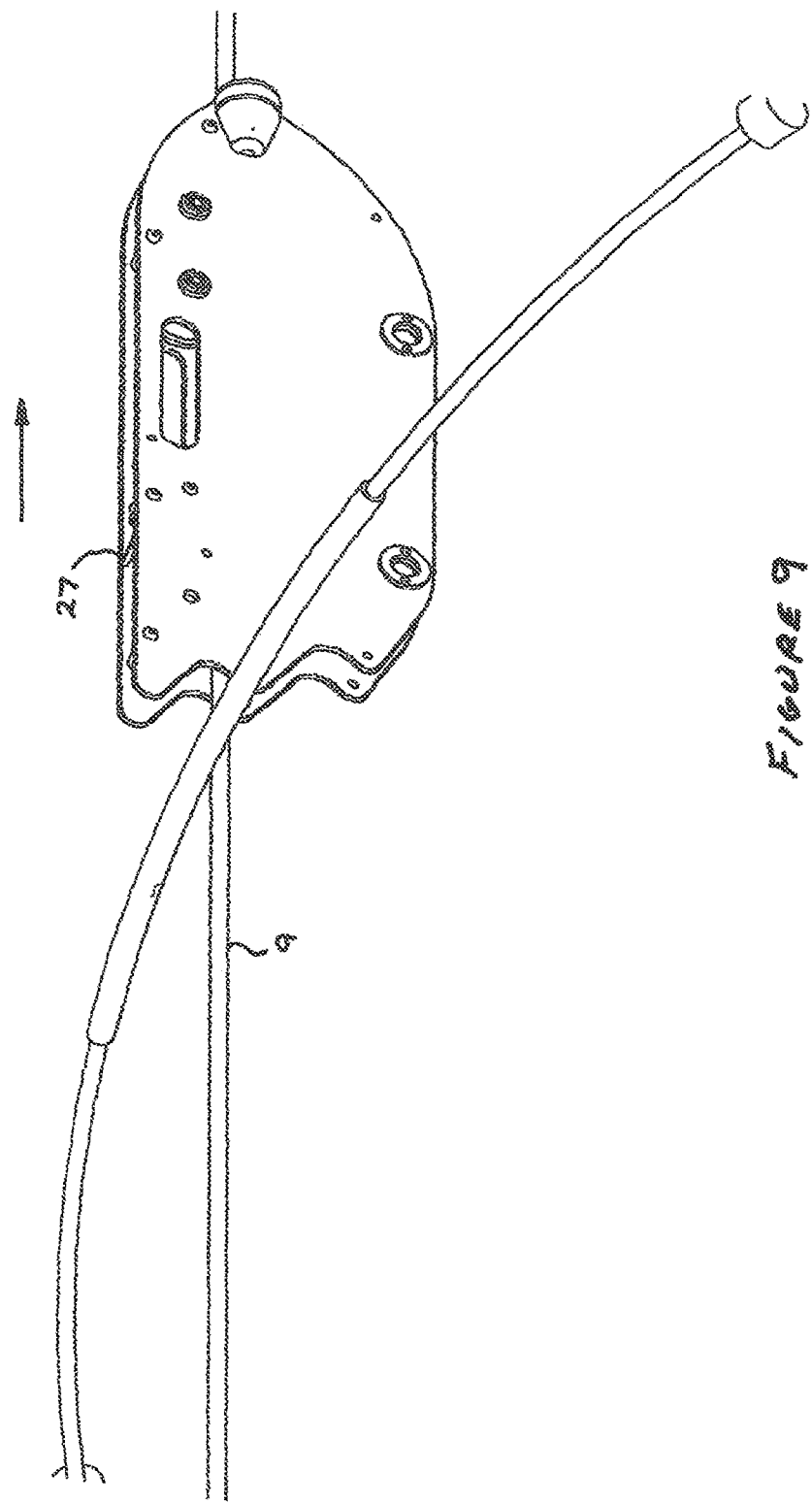
FIG. 9 is a view of the zipwire trolley of FIG. 7 shown having passed the rope grab of FIG. 7.

In a third embodiment of the invention as shown in FIGS. 7 to 9 the brake block 12b, shown in FIG. 8, is conveniently mounted in front of the trailing roller 21 of a relatively large conventional three roller zipwire trolley 1a suitable for carrying a person horizontally by means of a pair of karabiner-attachment eyes 24, 25, with the other rollers 22, 23 being at the forward end of the trolley 1a. Swivelably mounted above the brake block 12b is a lever arm 26 having an upper end 27 and a lower end 28 engagable with a curved surface 29 on the upper part of the brake block 12b when the lever arm rotates in an anti-clockwise direction, such as by engaging with a grab rope 30 at the buffer end of the zipwire 9, and a yoke 31 engageable with the free end of the upper end 27 of the lever arm 26 when it rotates in a clockwise direction, such that if the grab rope 30 misses the upper end 27 of the lever arm 26 but the buffer system at the end of the zipwire 9 has slowed the trolley 1a by an amount sufficient to cause the lever arm 26 to tilt forwards and rotate in a clockwise direction. Rotation of the lever arm 26 serves to prevent the brake block 12b from engaging with the zipwire 9, thereby allowing the trolley 1a to be towed back after it has gone past the buffer point before the lever arm 26 is re-set to its normally upright condition.

Figure 1:
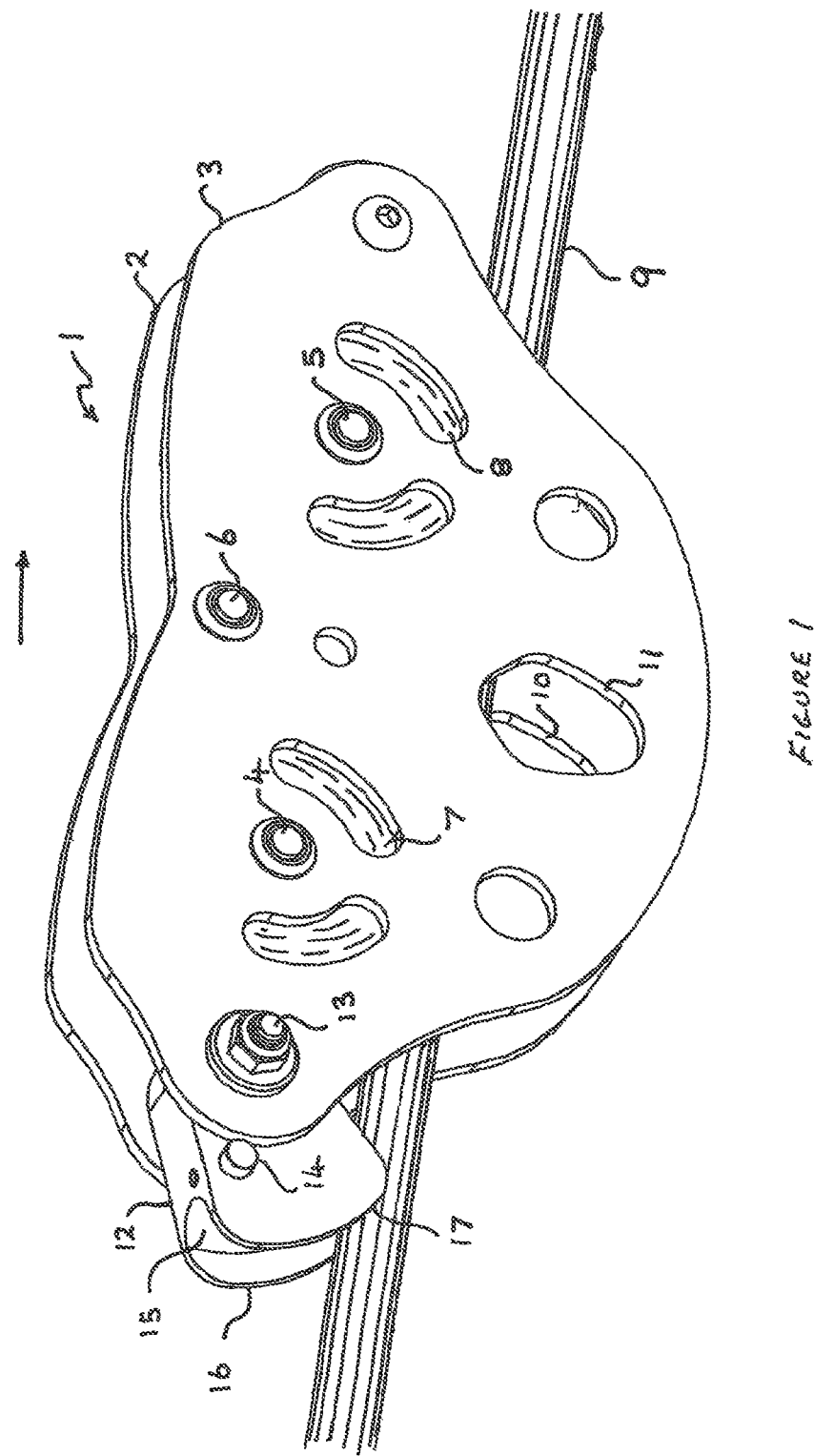
FIG. 1 is a perspective side view of a zipwire trolley mounted for rolling movement on a zipwire, with the brake mechanism shown resting on a zipwire and trailing a zipwire trolley roller.
Figure 10:
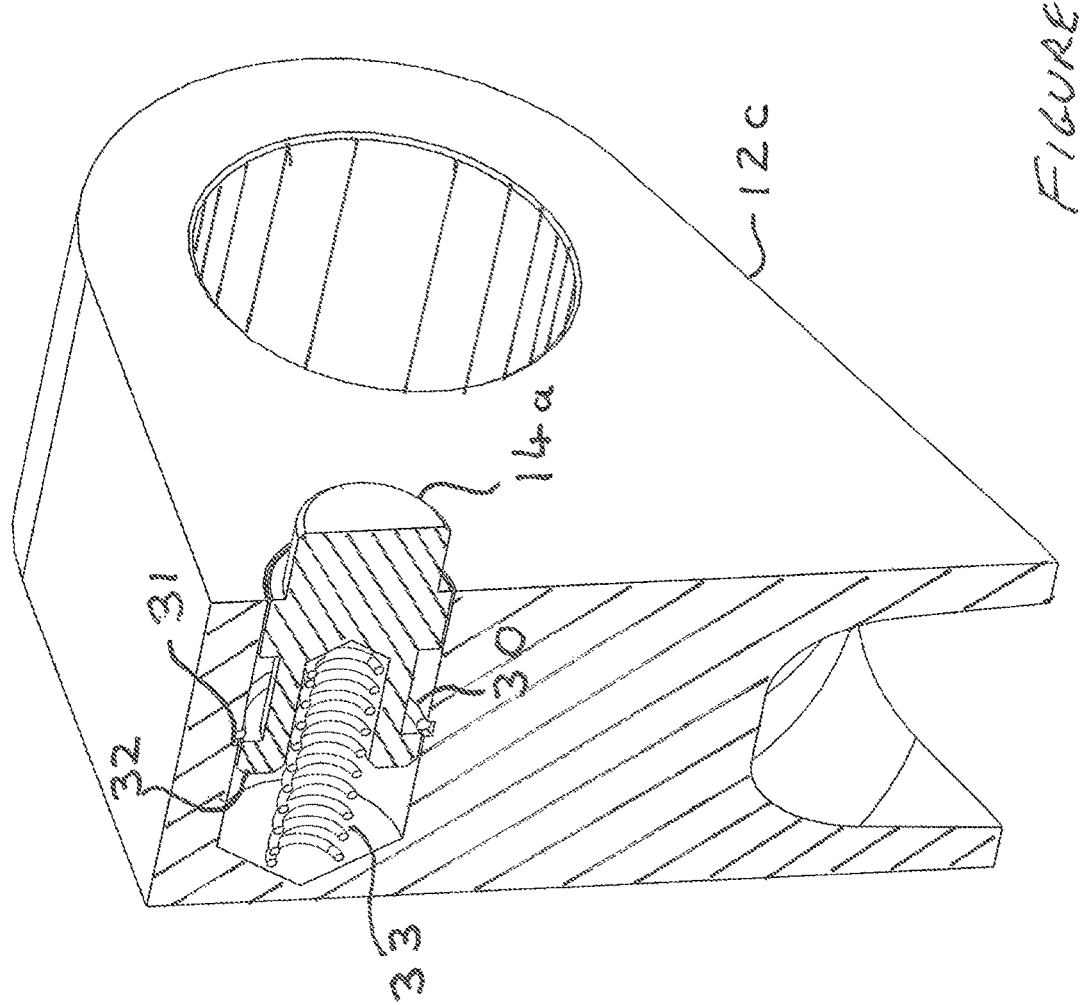
FIG. 10 is a sectional view of a preferred embodiment of a brake block deactivation pin to that shown in FIG. 1.

FIG. 10 shows a preferred embodiment of brake block 12c having a deactivation pin 14a which, unlike the deactivation pin 14 shown in FIG. 1, is not retained in its spring-biased state by means of a cotter pin but instead uses for that purpose a part-circular spring clip 30 receivable within an annular channel 31 in the block 12c, the clip 30 co-operating with a shoulder 32 on the inner end of the deactivation pin 14a to limit the extent of outward travel which would otherwise occur due to the bias of the coil spring 33. This is a particularly convenient arrangement requiring fewer machining steps as compared to the use of a cotter pin to limit the outward extent of movement of the pin 14 shown in FIG. 1, the pin 14a and attendant spring 33 being insertable into the block 12c in a single pressing. A further advantage is that it allows the spring 33 to extend into the body of the pin 14a which thereby serves to act as a holder or sleeve for the spring 33 without any separate means being required to ensure that it is aligned with the major axis of the pin 14a during assembly and/or replacement.

The invention claimed is:

1. A zipwire trolley having a plurality of zipwire engaging rollers, a swivelable brake block adjacent to one of the rollers, the brake block having a zipwire-engaging cam by which the roller can be at least partially lifted off the zipwire when the trolley is moving in a rearward direction, the cam having a pair of tapered sidewalls tending to pinch respectively opposite sides of the upper part of the zipwire as the brake block progressively rotates when the trolley is moving in a rearward direction, thereby preventing or inhibiting further rearward movement of the trolley.

2. A zipwire trolley according to claim 1 wherein the brake block is adjustable as to width.

3. A zipwire trolley according to claim 2 wherein the brake block is adjustable by being split in a plane coincident with the major axis of the zipwire when the brake block is mounted thereon.

4. A zipwire trolley according to claim 1 wherein the brake block is co-operable with a swivelable lever arm by which upon anti-clockwise rotation of the lever arm the brake block mechanism is disengaged, thereby allowing the zipwire trolley to be moved along the zipwire in a rearward direction relative to a normal forward direction.

5. A zipwire trolley according to claim 4 wherein clockwise movement of the lever arm also disengages the brake block by causing the brake block to swivel away from the zipwire.

6. A swivellable zipwire trolley brake block assembly having a cam with tapered sidewalls tending to pinch respectively opposite sides of the upper part of the zipwire as the brake block progressively rotates when the trolley is moving in a rearward direction, thereby preventing or inhibiting further rearward movement of the trolley.

7. The brake block assembly of claim 6 wherein the brake block is adjustable as to width.

8. The brake block assembly of claim 7 wherein the assembly is split in a plane coincident with the major axis of the zipwire when the brake block is mounted thereon.

9. A brake block assembly according to claim 6 wherein the brake block is co-operable with a swivelable lever arm by which upon anti-clockwise rotation of the lever arm the brake block mechanism is disengaged, thereby allowing the zipwire trolley to be moved along the zipwire in a rearward direction relative to a normal forward direction of travel.

10. A brake block assembly according to claim 9 wherein clockwise movement of the lever arm also disengages the brake block from the zipwire by causing the bracke block to swivel away from the zipwire.

\* \* \* \* \*

UNITED STATES PATENT AND TRADEMARK OFFICE
CERTIFICATE OF CORRECTION

PATENT NO. : 10,023,208 B2
APPLICATION NO. : 15/067742
DATED : July 17, 2018
INVENTOR(S) : Kevin Brown Page 1 of 1

It is certified that error appears in the above-identified patent and that said Letters Patent is hereby corrected as shown below:

Column 5, Line 9, please replace "bracke" with ---brake---.

Signed and Sealed this
Twenty-fifth Day of September, 2018

Andrei Iancu
*Director of the United States Patent and Trademark Office*